US011597263B2

United States Patent
Petelka

(10) Patent No.: US 11,597,263 B2
(45) Date of Patent: Mar. 7, 2023

(54) MODULAR CORNER UPLIFT ASSEMBLY

(71) Applicant: Petelka Investments Inc., Puslinch (CA)

(72) Inventor: Brian W. Petelka, Puslinch (CA)

(73) Assignee: PETELKA INVESTMENTS, INC., Puslinch (CA)

( * ) Notice: Subject to any disclaimer, the term of this patent is extended or adjusted under 35 U.S.C. 154(b) by 0 days.

(21) Appl. No.: 17/079,344

(22) Filed: Oct. 23, 2020

(65) Prior Publication Data

US 2022/0234428 A1      Jul. 28, 2022

Related U.S. Application Data

(60) Provisional application No. 62/925,888, filed on Oct. 25, 2019.

(51) Int. Cl.
*B60J 7/10*          (2006.01)

(52) U.S. Cl.
CPC ..................... *B60J 7/104* (2013.01)

(58) Field of Classification Search
CPC ..... B60J 7/06; B60J 7/064; B60J 7/065; B60J 7/10; B60J 7/102; B60J 7/104; B60P 7/02; B60P 7/04

USPC ............................. 296/100.1, 100.11, 100.01
See application file for complete search history.

(56) References Cited

U.S. PATENT DOCUMENTS

| | | | | |
|---|---|---|---|---|
| 6,973,433 B2* | 12/2005 | Haug | ..................... | B41J 11/005 705/1.1 |
| 8,439,424 B1* | 5/2013 | Damsi | ..................... | B60J 7/104 296/100.18 |
| 9,499,033 B1* | 11/2016 | Nixon | ......................... | B60J 7/10 |
| 9,701,348 B2* | 7/2017 | Damsi | ..................... | B60J 7/062 |

\* cited by examiner

*Primary Examiner* — D Glenn Dayoan
*Assistant Examiner* — Veronica M Shull
(74) *Attorney, Agent, or Firm* — Jonathan Kidney; Intelink Law Group, P.C.

(57) ABSTRACT

A joint system for use with a plurality of bows in an uplift of a tarpaulin system having a joint and a base insert with, a body component with a first base end and a second base end, a third coupling member extending from the first base end, the third coupling member adapted to releasably engage with a free end of one of the plurality of bows, a fourth coupling member fixed to the second base end, the fourth coupling member adapted to be securable to a component of the uplift, and a third support extending from the first base end proximate the third coupling member for engaging with the bow releasably secured with the third coupling member.

19 Claims, 20 Drawing Sheets

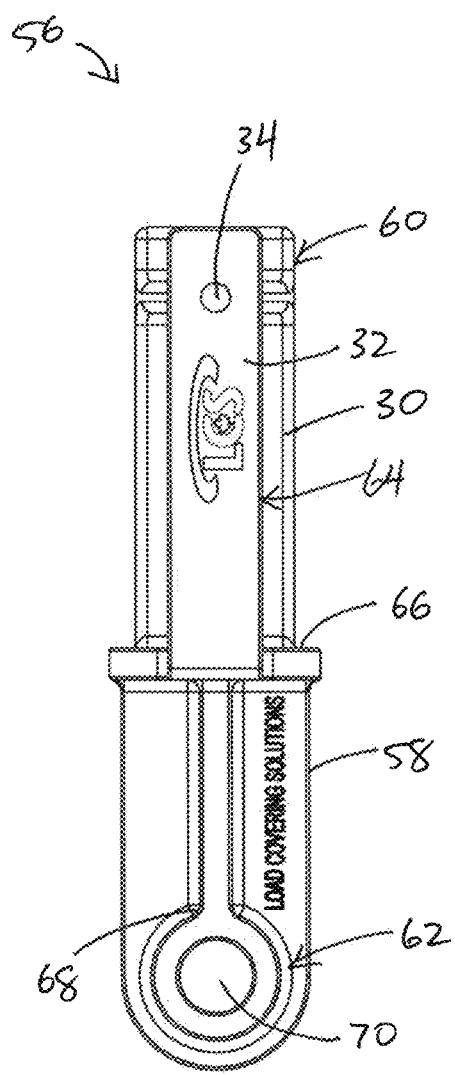
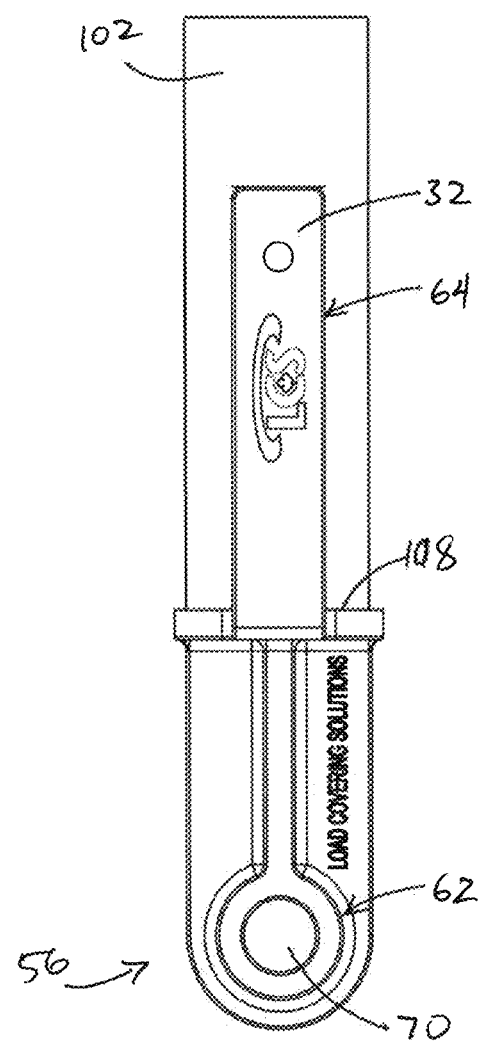
FIG. 18                    FIG. 19

MODULAR CORNER UPLIFT ASSEMBLY

FIELD

The invention relates generally to tarpaulin systems for covering the open decks of flatbed vehicles and trailers. In particular, the invention relates to an apparatus and system for use with bows in an uplift of the tarpaulin system.

BACKGROUND

Trucks having trailers with flat beds, which are well known in the transportation industry, are commonly used for shipping goods, either locally, regionally or internationally. In order to protect goods loaded on the flat bed from exposure to the elements, vandalism or theft, the goods are typically covered with tarpaulins, or tarps, whose shape are maintained by a system of bars or bows. Such systems are typically referred to as uplifts.

The bars, or bows are often rigid tubes, which may be shaped or otherwise formed into the desired skeleton of the uplift. While effective, such assemblies may twist or bend when large external pressures are applied, such as when snow, ice and/or rain loads apply downward forces to the roof of the rolling tarp system. As well, the corners of the uplifts are particularly susceptible to warping and deformation when external pressures are applied thereto.

SUMMARY

Disclosed herein is a joint for use with a pair of bows in an uplift of a tarpaulin system, the joint comprising: a corner component with a first end and a second end; a first coupling member extending from the first end, the first coupling member adapted to be releasably engagable with an end of one of the pair of bows; a second coupling member extending from the second end, the second coupling member adapted to be releasably engagable with an end of the other of the pair of bows; a first support extending from the first end proximate the first coupling member for engagement with the one bow that is releasably engagable with the first coupling member.

There is also disclosed herein is a joint system for use with a plurality of bows in an uplift of a tarpaulin system, the joint system comprising: a first joint according to the joint described above, and a second joint according the joint described above, wherein the bracket of the first joint is a first bracket and the bracket of the second joint is a second bracket, the first and second brackets are collectively engagable to form a hinge.

There is further disclosed herein a joint system for use with a plurality of bows in an uplift of a tarpaulin system, the system comprising a joint as described above and a base insert comprising: a body component with a first base end and a second base end; a third coupling member extending from the first base end, the third coupling member adapted to releasably engage with a free end of one of the plurality of bows; a fourth coupling member fixed to the second base end, the fourth coupling member adapted to be securable to a component of the uplift; a third support extending from the first base end proximate the third coupling member for engaging with the bow releasably secured with the third coupling member.

Directional references herein such as "front", "rear", "up", "down", "horizontal", "top", "bottom", "side" and the like are used purely for convenience of description and do not limit the scope of the present disclosure. Furthermore, any dimensions provided herein are presented merely by way of an example and unless otherwise specified do not limit the scope of the disclosure. Furthermore, geometric terms such as "straight", "flat", "curved", "point" and the like are not intended to limit the disclosure to any specific level of geometric precision, but should instead be understood in the context of the disclosure, taking into account normal manufacturing tolerances, as well as functional requirements as understood by a person skilled in the art.

BRIEF DESCRIPTION OF THE DRAWINGS

Reference will now be made, by way of example, to the accompanying drawings which show example embodiments of the present application.

FIG. 18 is a plan view of the base insert according to FIG. 17.

FIG. 19 is a plan view of the base insert according to FIG. 17 in use with a bow.

Similar reference numerals may have been used in different figures to denote similar components.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention.

DESCRIPTION OF EXAMPLE EMBODIMENTS

Example embodiments of the single joint, double joint, and joint system of the present invention will now be described with reference to the attached figures.

Figure 1:
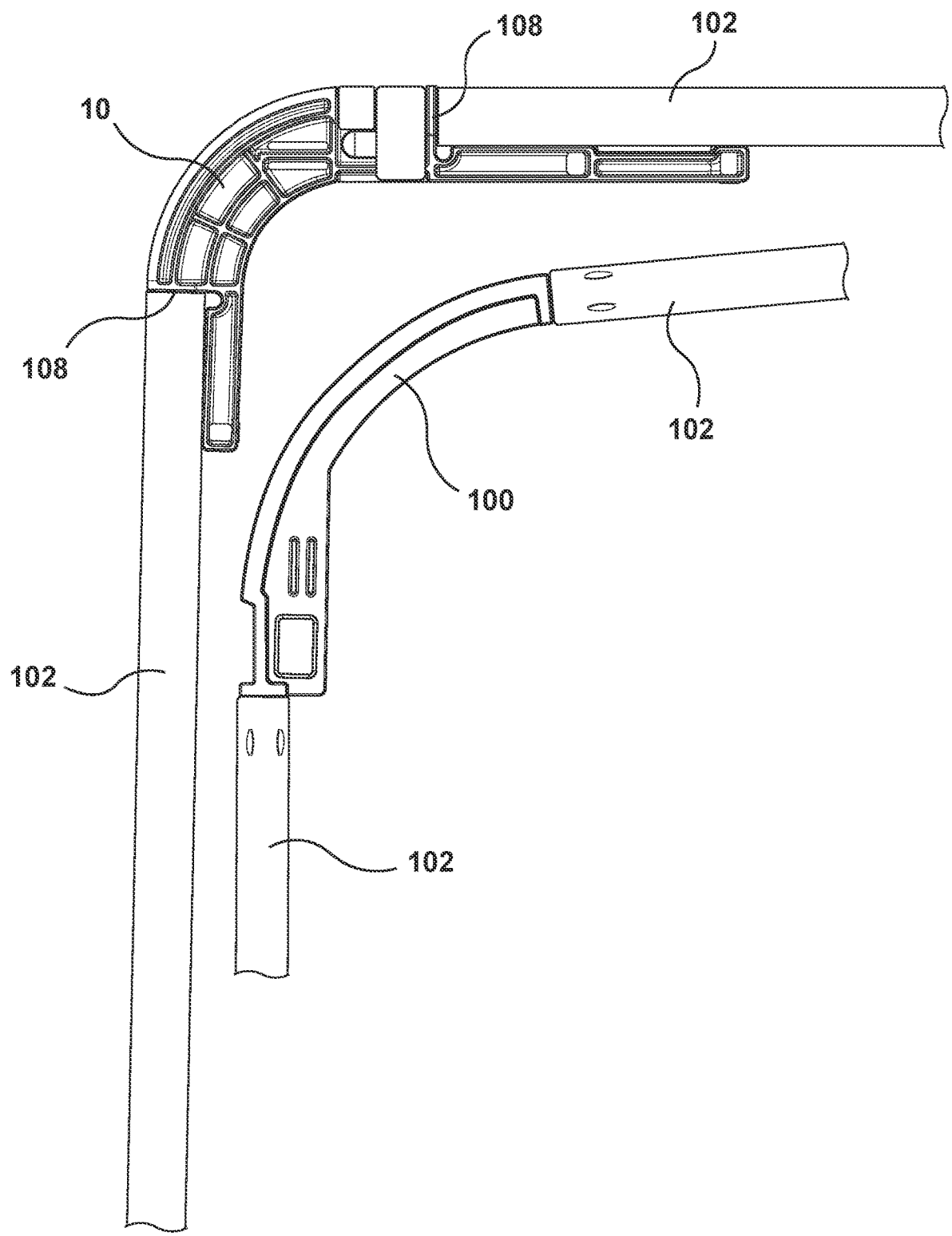
FIG. 1 is a side view of a single joint according an example embodiment of the present invention in use with a pair of bows, and a side elevational view of a conventional joint in use with a pair of bows.
Figure 2:
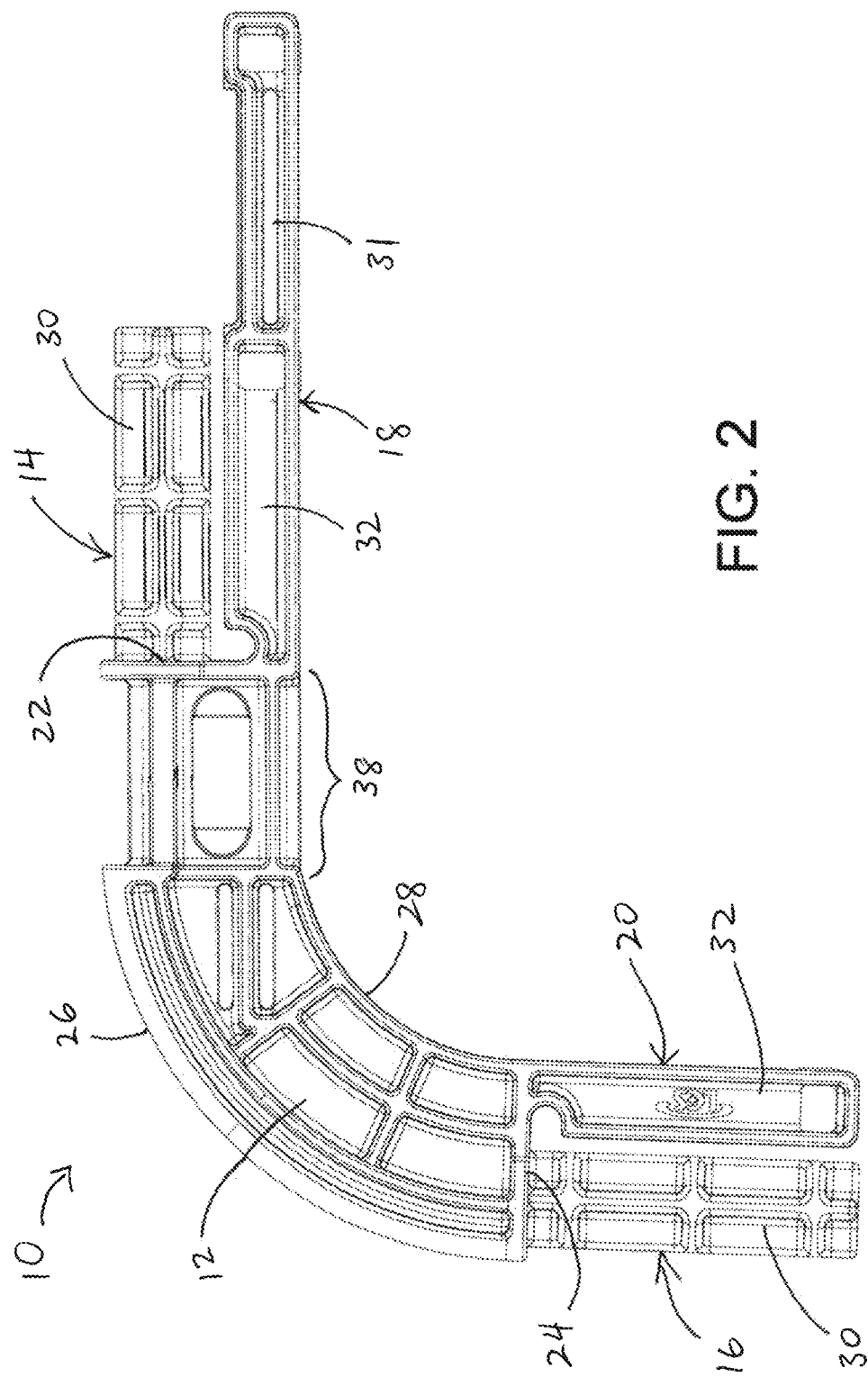
FIG. 2 is a side elevational view of the single joint of the present invention according to FIG. 1.
Figure 3:
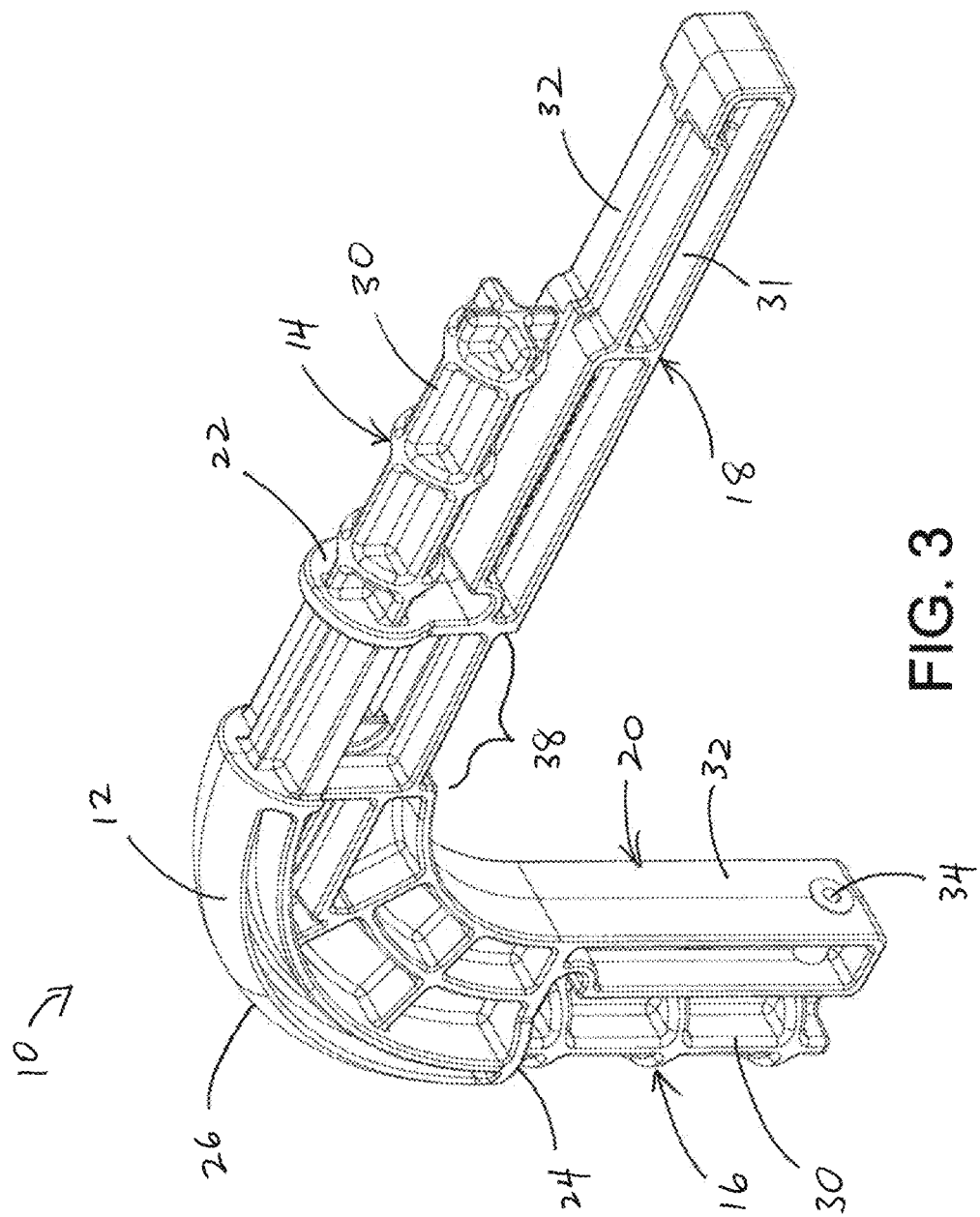
FIG. 3 is an upper perspective view of the joint according to FIG. 2.
Figure 4:
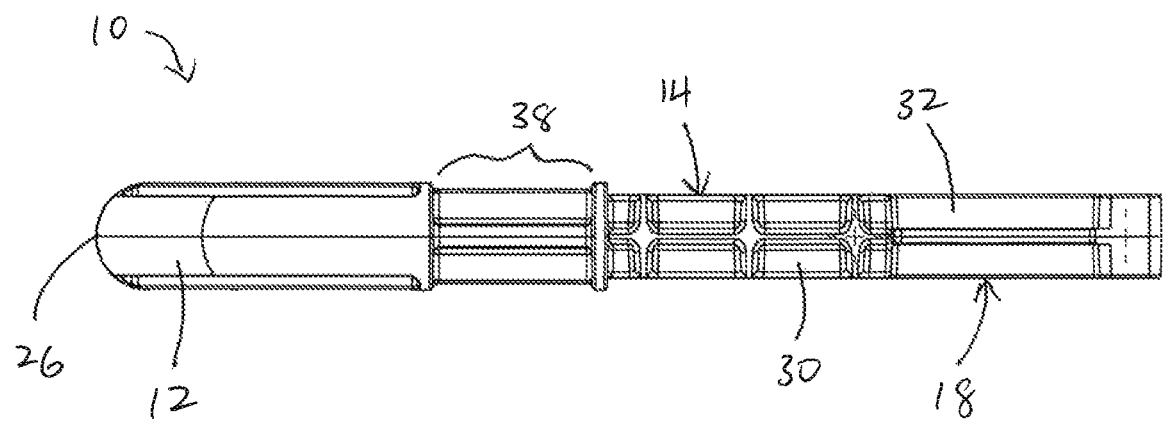
FIG. 4 is a plan view of the joint according to FIG. 2.
Figure 5:
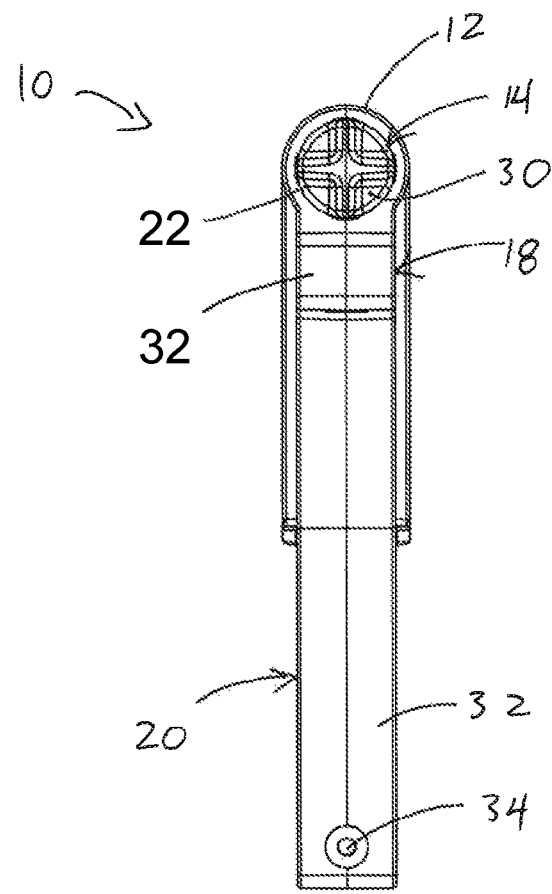
FIG. 5 is a back elevational view of the joint according to FIG. 2.

Referring to FIG. 1, there is shown a conventional joint 100 connecting a pair of tubes or bows 102 for use in an uplift system 104 with a tarp 110 of a tarpaulin system 106 (see also FIGS. 20-24). As noted above, while such a joint provides some structural support to the corners of an uplift system, its configuration is still susceptible to warping and deformation when external pressures are applied thereto.

FIGS. 1-5 illustrate a single joint 10 embodiment of the invention for use with a pair of bows 102 in an uplift 104 of a tarpaulin system 106 (see also FIGS. 14-16 and 20-24). In the depicted embodiment, joint 10 includes a corner component 12, a first coupling member 14, a second coupling member 16, a first support 18, and, optionally, a second support 20.

Elbow or corner component 12, as shown, is a curved elongate piece with generally a quarter of an annulus shape. Corner component 12 has a first end 22, a second end 24. Corner component 12 further has an outer curved surface 26 and an inner curved surface 28, both curved surfaces extending between first end 22 and second end 24, where the radius of outer curved surface 26 is larger than the radius of inner curved surface 28.

In certain applications, the radius of outer curved surface 26 may be between three inches and six inches. The radius of inner curved surface 28 would, understandably, be smaller. As understood by the skilled person, other dimensions are possible.

The quarter annulus shape itself has a built-in angle, for example 92 degrees, to ensure that bow 102 that extends therefrom, rises up to 1.5 inches above rolling flat roof car frames. Of course, other angles may be used. This geometry helps to maintain a consistent arch or elliptical for water run-off and helps to apply the same or similar pressure onto tarp 110 in the corner areas. With a conventional roll frame with a bent tube for a corner, the geometry of the corner tends to be inconsistent as the tube get bent or warped with use.

First support 18 may have a slot 31 that extends laterally through first support 18. Slot 31 may be 2 inches wide, for example, to receive a web strap (not shown) therethrough, where the strap is securable to, or may be tied around, bow 102 of uplift system 104 to further help secure joint 10 to bow 102. As understood by the skilled person, slot 31 may have a different dimension or shape and/or it may have a different orientation or position within joint 10. Alternately, a strap may instead or also be inserted between the first coupling member and the first support, which will be discussed further below. The strap may then be secured to or tied around bow 102 to help secure joint 10 to bow 102.

Corner component 12 may optionally have ridges or ribs to help provide further rigidity to corner component 12. Additionally or alternately, corner component 12 may have a hollow coring out that may help to add structural strength to joint 10.

First coupling member 14 is shown extending from first end 22, where first coupling member 14 is adapted to be releasably engagable with an end 108 of one of the pair of bows 102. Second coupling member 16 is shown extending from second end 24, where second coupling member 16 is adapted to be releasably engagable with another end 108 of the other of the pair of bows 102.

While the present embodiment refers to a pair of bows 102, as understood by the skilled person, first and second coupling members 14, 16 may be engagable with the two ends of the same bow 108, which may be bent into a shape in which its two ends meet at a corner.

First and second coupling members 14, 16, as depicted, are elongate extensions 30 which are dimensioned to be inserted through ends 108 into bows 102. In this manner, elongate extensions 30 may be sized so as to frictionally engage with bows 102 when inserted therein, the friction fit helping to releasably retain first and second coupling members 14, 16 within bows 102. Elongate extensions 30 may also optionally have ridges or ribs to help provide further rigidity to elongate extensions 30.

While first and second coupling members 14, 16 are shown to be elongate extensions 30, first and second coupling members 14, 16 may have different structures to releasably retain first and second coupling members 14, 16 within bows 102. For example, first and second coupling members 14, 16 may have an external rim or protrusion that engages with an internal rim or depression within bows 102 in a snap-fit relation. Alternately, first and second coupling members 14, 16 may have an external thread that engages with an internal thread within bows 102.

First support 18 also extends from first end 22 proximate first coupling member 14 for engagement with the bow that is releasably engagable with first coupling member 14. In the depicted embodiment, joint 10 further includes second support 20 that extends from second end 24 proximate second coupling member 16 for engagement with the other bow that is releasably engagable with second coupling member 16. In other applications, joint 10 may or may not include second support 20.

First and second supports 18, 20 are shown to be elongate tabs 32 which extend generally parallel to their respective first and second coupling members 14, 16 from their respective first and second ends 22, 24. In particular, the coupling members and the supports are spaced apart such that the space can receive a bow 102 therein.

In this manner, when elongate extensions 30 of coupling members 14, 16 are inserted into their respective ends 108 of bows 102, elongate tabs 32 of first and second supports 18, 20, are positioned externally to, and abutting with, bows 102. They, thus, collectively cradle and hold their respective bows 102 therebetween. For example, coupling member 14 and first support 18 collectively cradle and hold bow 102 therebetween, as shown in FIG. 1. The presence of first and second supports 18, 20 helps to provide increased support, like a gusset, to the corner and the bows 102.

In particular, as also shown in the depicted embodiment, first coupling member 14 is positioned adjacent outer curved surface 26 and first support 18 is positioned adjacent inner curved surface 28. In a similar manner, second coupling member 16 is positioned adjacent outer curved surface 26 and second support 20 is positioned adjacent inner curved surface 28.

Given the curve of corner component 12, it may be used to form a top corner of a tarpaulin system 106. Thus, the internal positioning of first and second supports 18, 20 may help to provide increased support and resistance to external forces that may be applied downwardly and laterally onto tarp 110 of tarpaulin system 106. The present joint helps to provide enhanced structural support to the corners of tarpaulin system 106 and helps to provide additional structural support to uplift system 104 when external pressures are applied thereto.

As noted above, the elbow, or quarter annulus shape, itself has a built-in angle to ensure that bow 102 that extends therefrom, rises up to 1.5 inches above rolling flat roof car frames. This helps to maintain a consistent arch or elliptical for water run-off and to help apply the same or similar pressure onto tarp 110 in the corner areas.

In alternate applications, the relative positioning of the coupling member and the supports may be different. For example, first coupling member 14 may be positioned adjacent inner curved surface 28 while first support 18 may be positioned adjacent outer curved surface 26. In a similar manner, second coupling member 16 may be positioned adjacent inner curved surface 28 and second support 20 may be positioned adjacent outer curved surface 26. Other variations are also possible.

The depicted embodiment also shows elongate tab 32 of first support 18 extending further from first end 22 than second support 20 extends from second end 24. Such a feature may be useful in applications where a great downward force is expected to be applied to the top of tarpaulin system 106. Alternate embodiments may include elongate tabs 32 of equal length, or elongate tab 32 of second support 20 extending further from second end 24 than first support 18.

As a further feature, first and second supports 18, 20 may each include at least one aperture 34 that extends, respectively, through first support 18 towards first coupling member 14, and through second support 20 towards second coupling member 16. Each aperture 34 is dimensioned to receive a fastener therethrough. The presence of apertures 34 allows a user to locate, drill and insert a fastener through first and second supports 18, 20 into bows 102 for securing the parts together.

Figure 6:
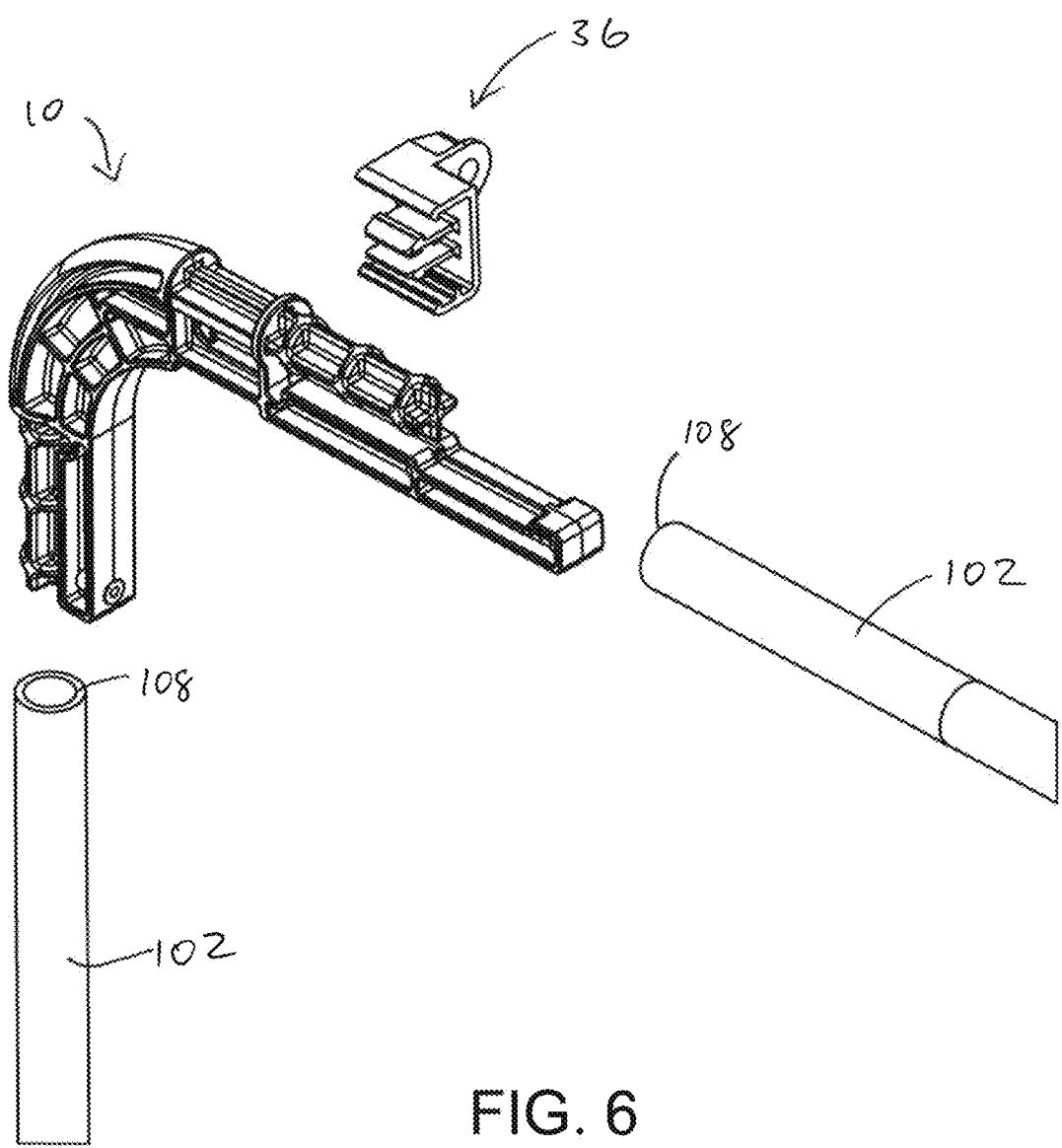
FIG. 6 is an exploded view of the single joint of FIG. 1 in use with a bracket.
Figure 8:
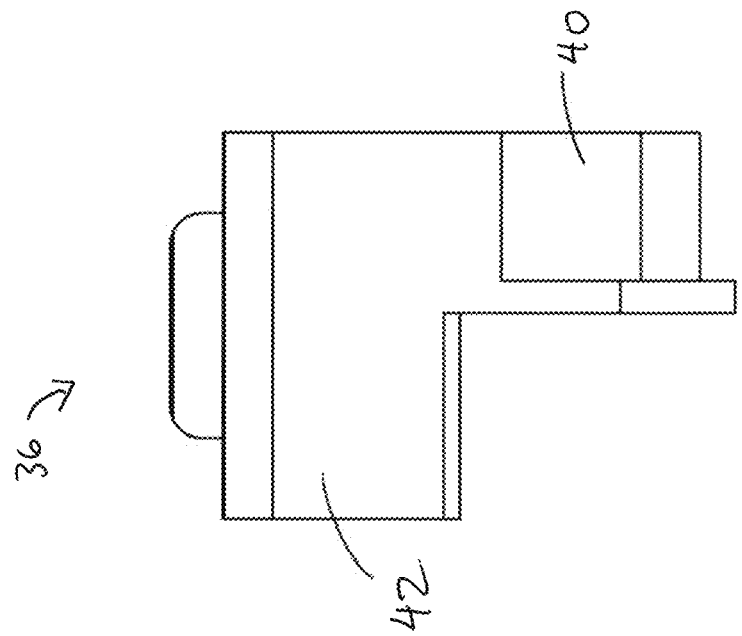
FIG. 8 is a plan view of the bracket according to FIG. 7.
Figure 7:
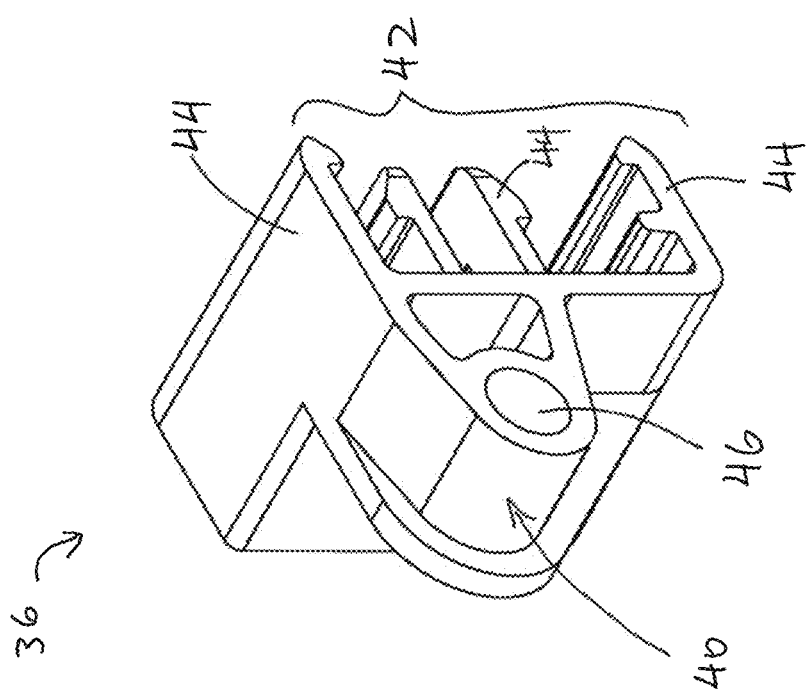
FIG. 7 is an enlarged perspective view of the bracket according to FIG. 6 in isolation.
Figure 10:
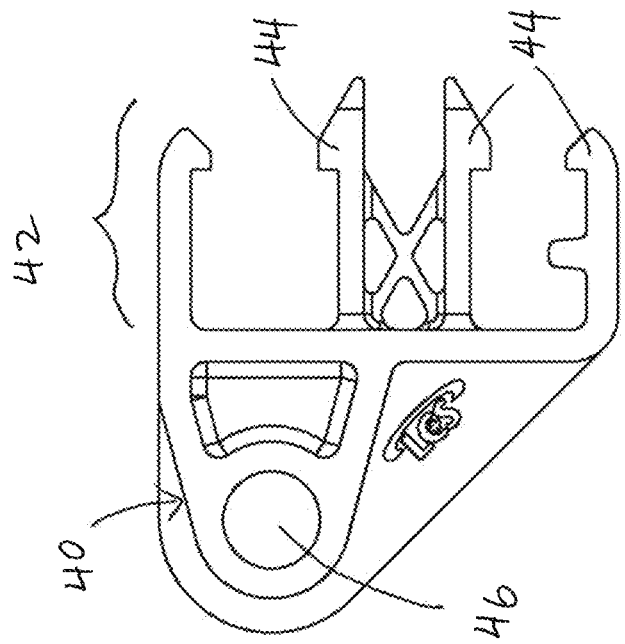
FIG. 10 is a side elevational view of the bracket according to FIG. 7.
Figure 9:
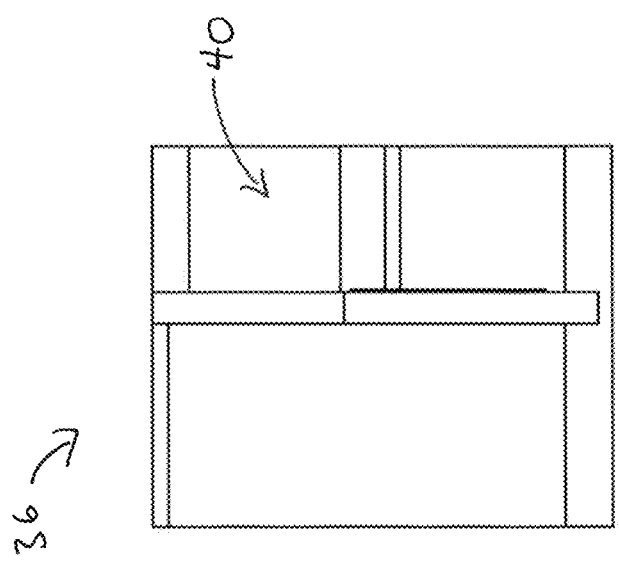
FIG. 9 is a front elevational view of the bracket according to FIG. 7.

As seen in FIG. 6, joint 10 may include, or be used with, a bracket 36, where bracket 36 is adapted to releasably engage with another bracket to form a hinge. Bracket 36 may be formed with joint 10 as a single unit, or bracket 36 may be a separate component that is securable to joint 10. In the depicted embodiment, bracket 36 is separate from, and securable to, corner component 12 of joint 10.

In that regard, corner component 12 is shown to include a bracket coupling portion 38, where bracket 36 is releasably securable to bracket coupling portion 38 of corner component 12. Bracket coupling portion 38 may be positioned adjacent first end 22, and thus be positioned adjacent first coupling member 14 and first support 18. In alternate applications, bracket coupling portion 38 may be situated at a different position along or on corner component 12.

Turning to FIGS. 7-10, there is shown bracket 36 which is adapted to releasably engage with bracket coupling portion 38 of corner component 12 through a snap-fit engagement. Bracket 36 is shown to comprise a knuckle portion 40 and a leaf portion 42 fixed together, where it is leaf portion 42 that is adapted to be releasably engagable with bracket coupling portion 38 through the snap-fit engagement. In particular, leaf portion 42 is shown to include resilient flanges 44 extending from knuckle portion 40. In a corresponding manner, bracket coupling portion 38 includes openings within and around which resilient flanges 44 may releasably engage.

While bracket 36 and bracket coupling portion 38 are shown to include structures that permit a releasable snap-fit engagement therebetween, bracket 36 and bracket coupling portion 38 may have other complementary structures that allow bracket 36 and bracket coupling portion 38 to releasably engage with one another. For example, bracket 36 and bracket coupling portion 38 may have a hook and loop coupling mechanism, or a latch mechanism.

Knuckle portion 40 has a hollow or bore 46 that may couple with another knuckle portion 40 of another bracket to form a hinge.

Figure 11:
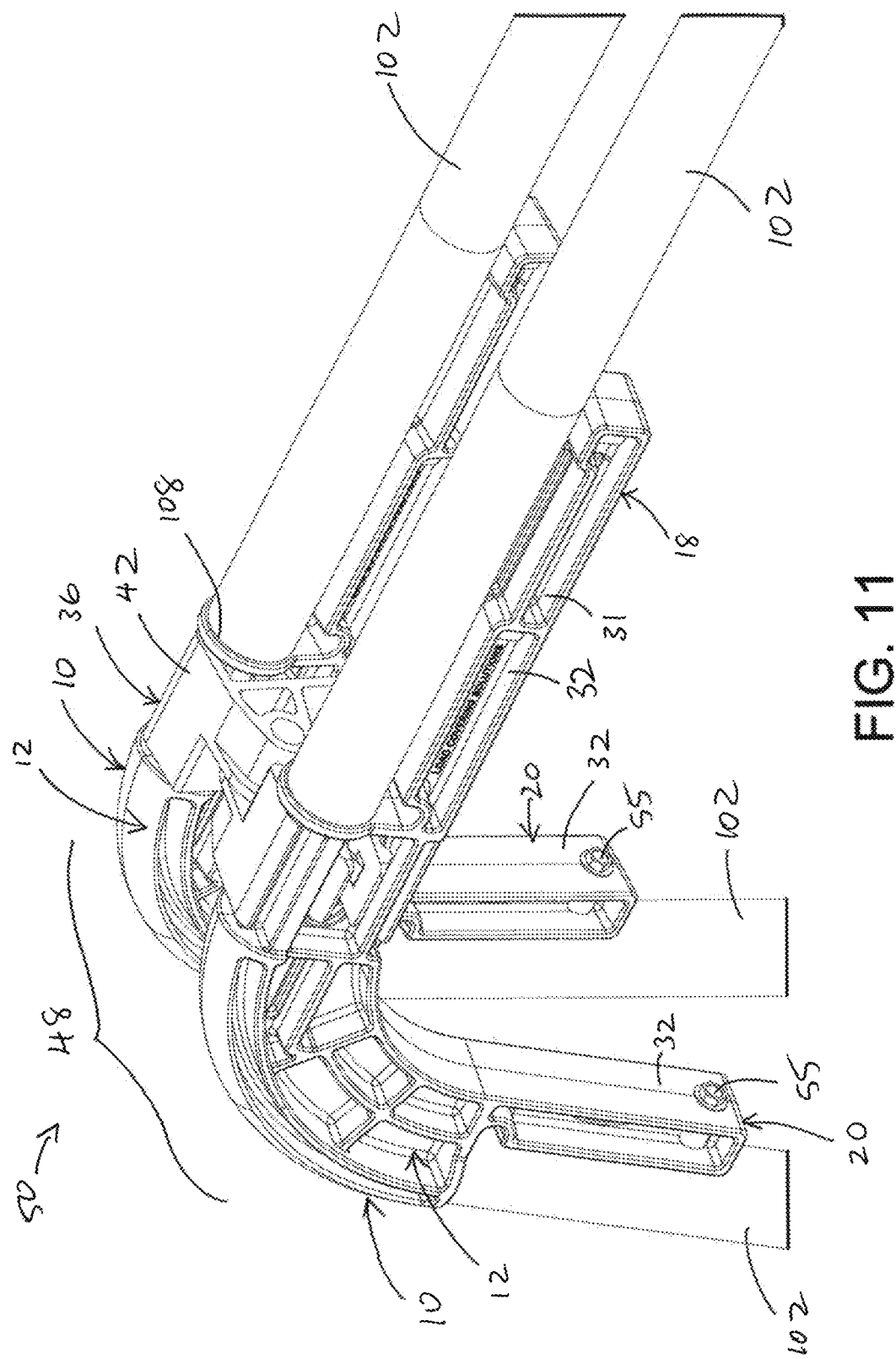
FIG. 11 is an upper perspective view of two joints according to FIG. 6 combined as a double joint according another example embodiment of the present invention in use.
Figure 12:
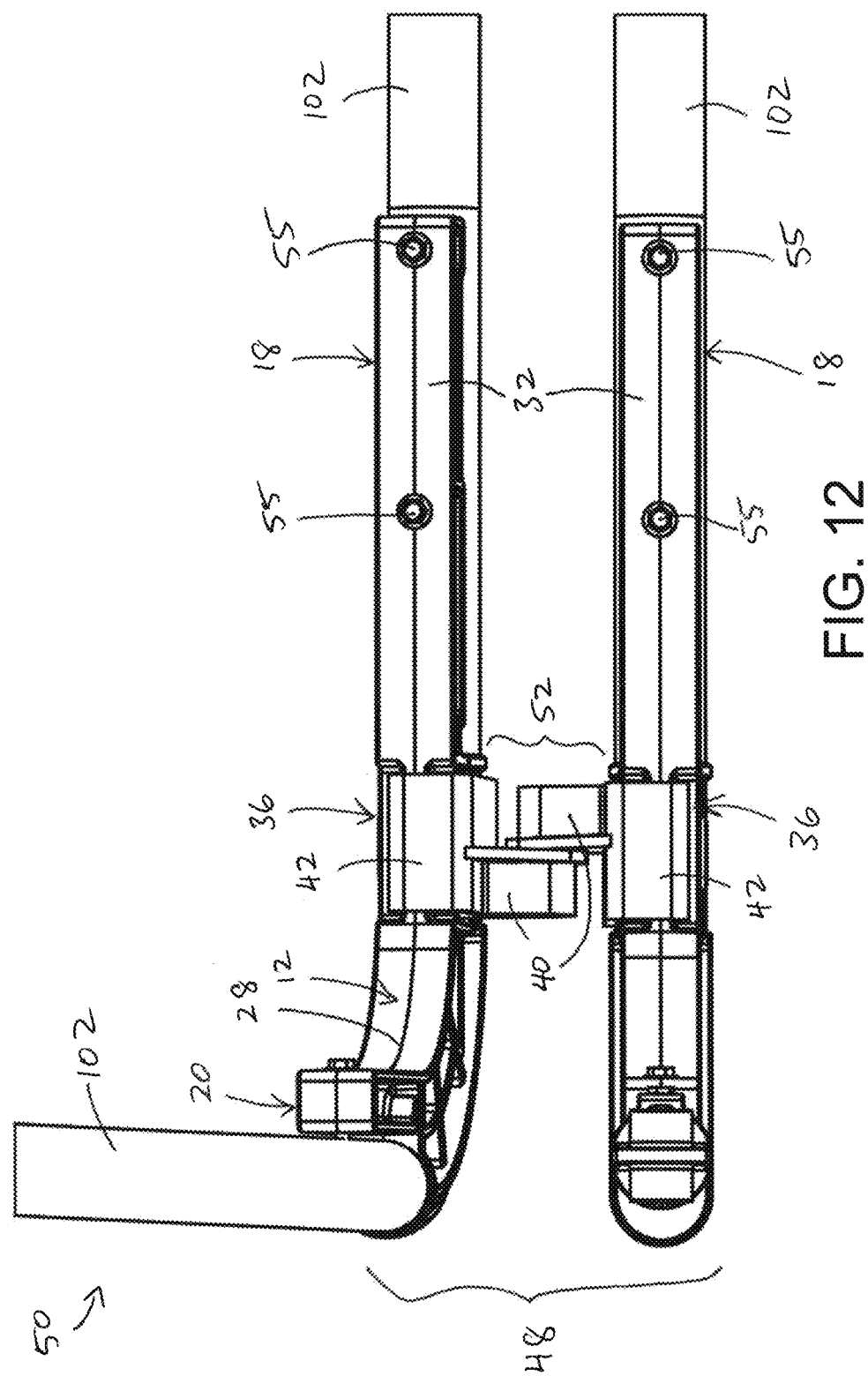
FIG. 12 is a bottom plan view the double joint according to FIG. 7.
Figure 13:
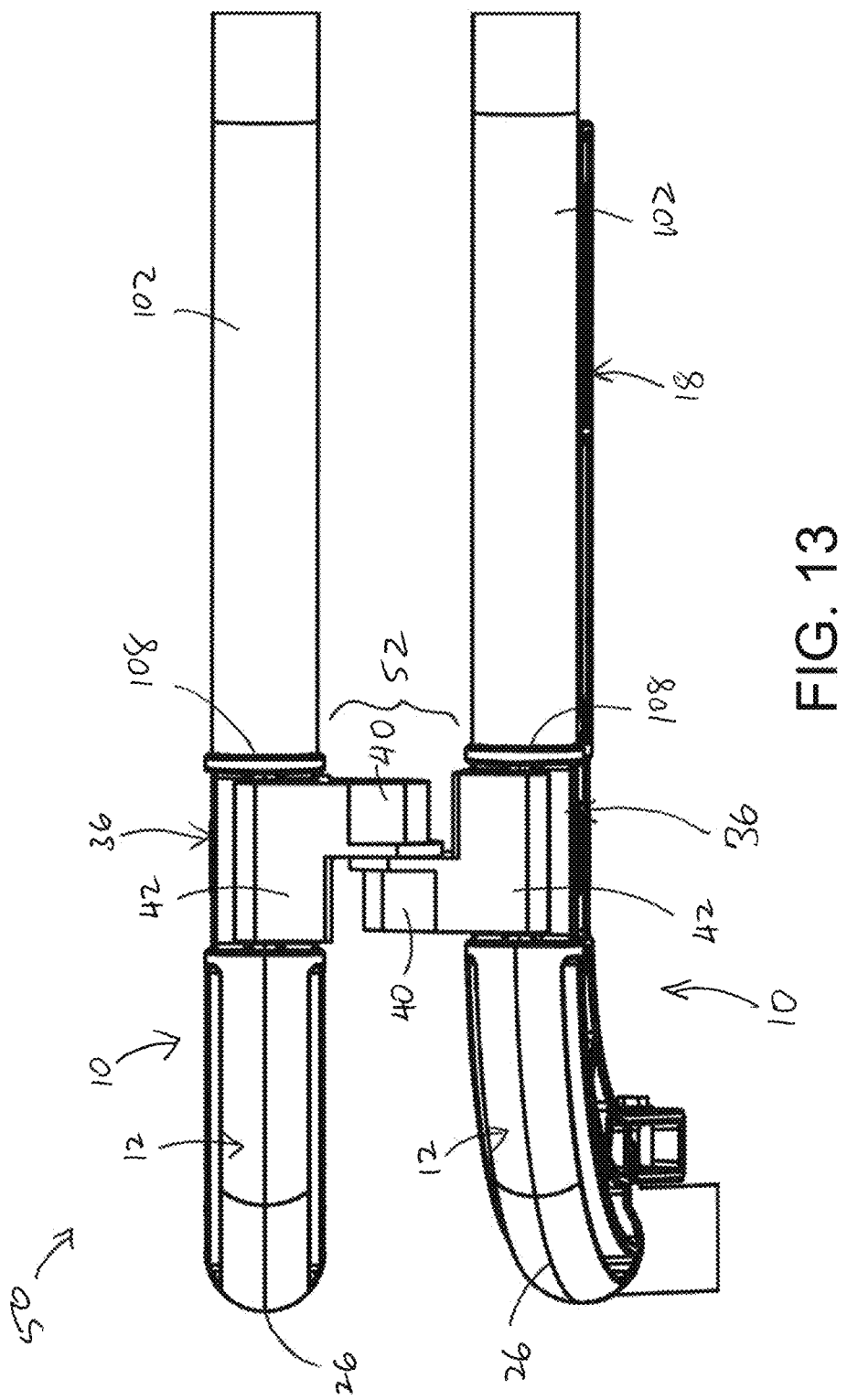
FIG. 13 is a plan view the double joint according to FIG. 7.
Figure 14:
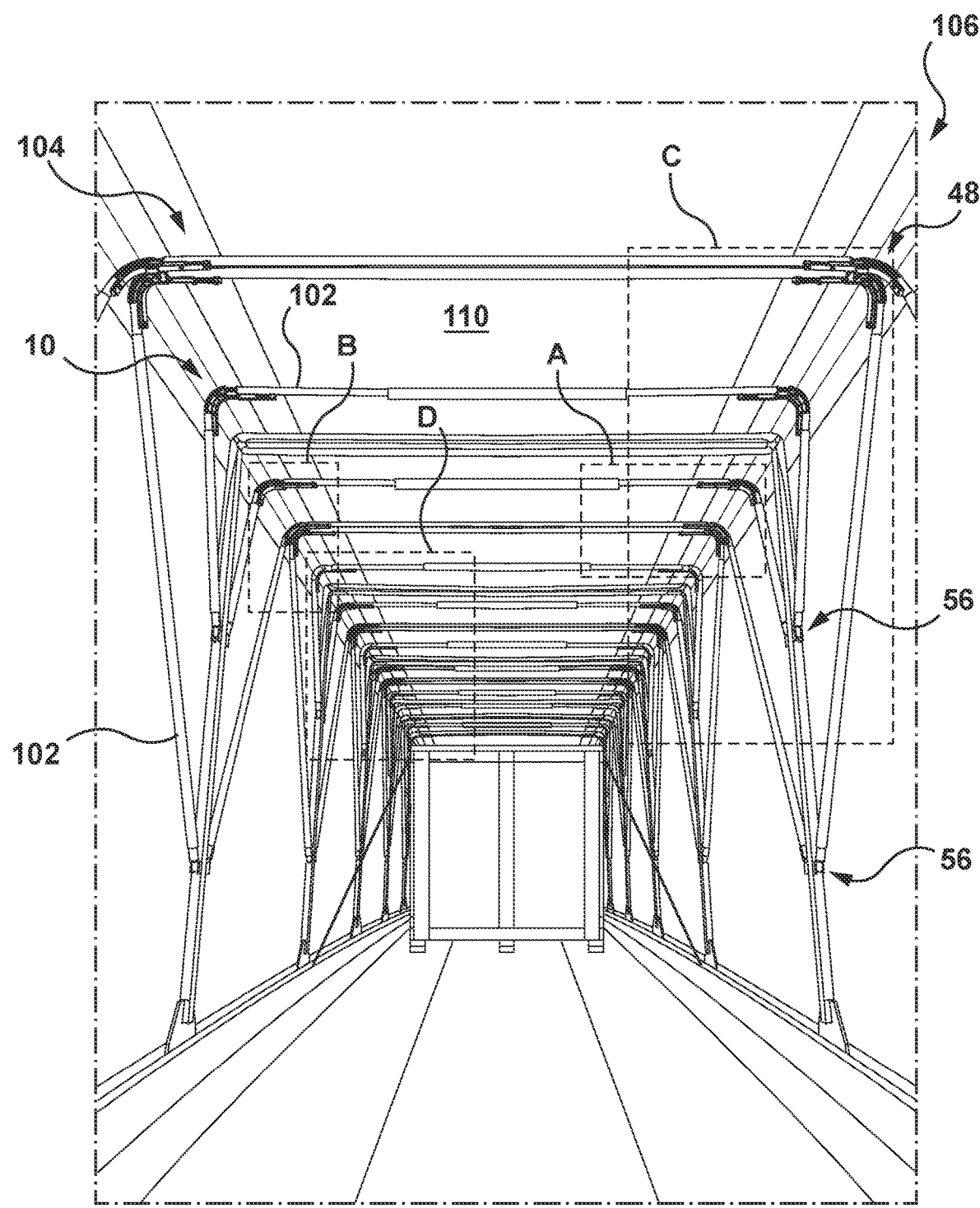
FIG. 14 is a perspective view of a joint system according an example embodiment of the present invention with the single joint according to FIG. 1 and the double joint according to FIG. 6 in use with a base insert in a tarpaulin system.
Figure 15:
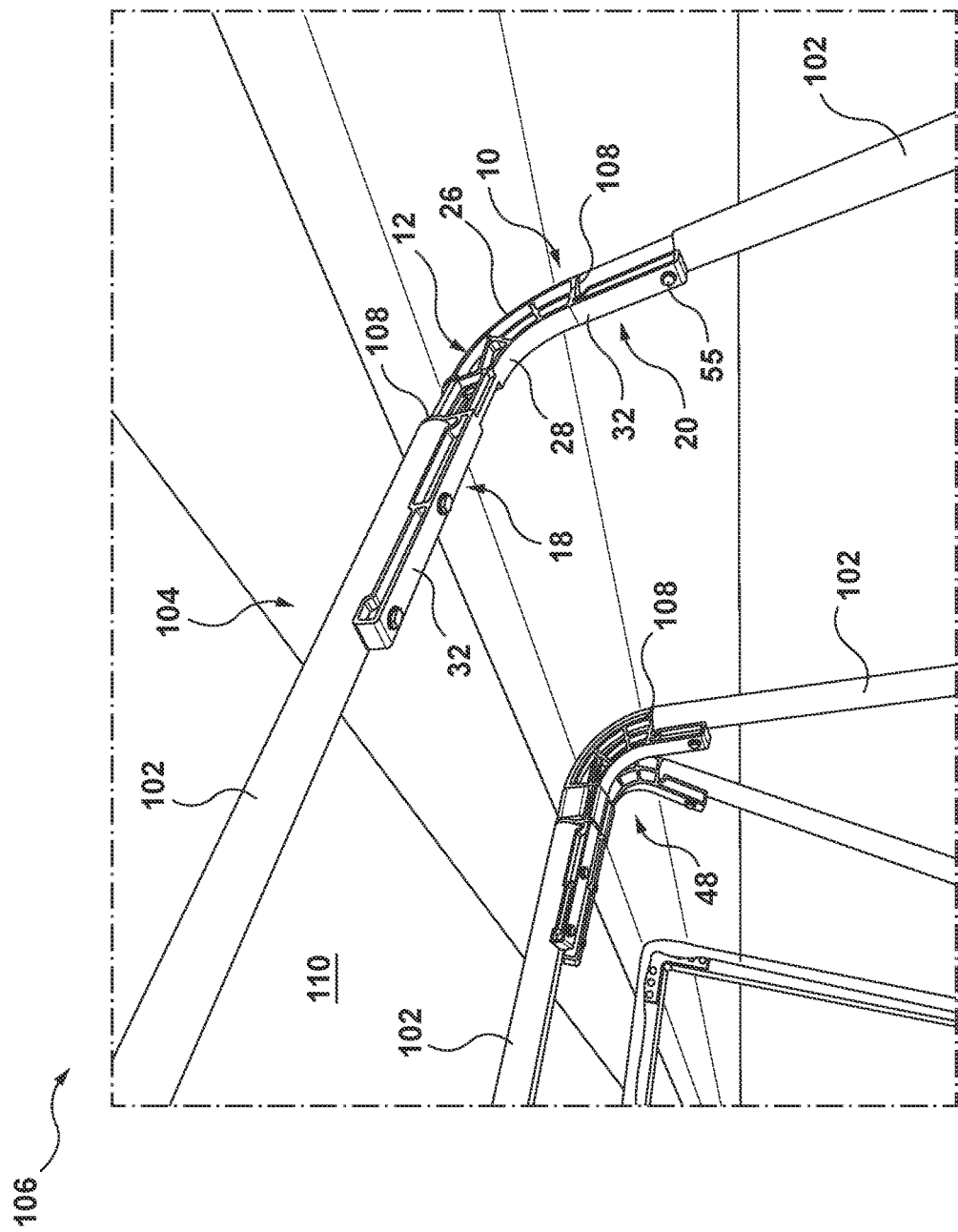
FIG. 15 is an enlarged lower perspective view of portion A of FIG. 14.

FIGS. 11-13 illustrate a double joint 48 in a joint system 50 for use with a plurality of bows 102 in an uplift 104 of a tarpaulin system 106 (see also FIGS. 14-16 and 20-24).

When leaf portion 42 is engaged with bracket coupling portion 38 of corner component 12, they may be coupled together with another bracket 36 and joint 10. In that regard, double joint 48 may include a first joint 10 and a second joint 10, wherein the bracket of the first joint is a first bracket and the bracket of the second joint is a second bracket, and the first and second brackets are collectively engagable to form a hinge 52.

To form hinge 52, a pin 54, that is dimensioned to be received through knuckle portions 40 of the first and second brackets, is inserted through knuckle portions 40 and secured in place. For example, pin 54 may be a bolt that is threaded through knuckle portions 40 and secured in place with a nut. Other fasteners may be used instead. In this manner, joint 10 may be used as a single joint or together with another joint as a double joint, where the first and second joints may be rotated into different angles relative to one another as desired.

Hinge 52 is positioned between the two joints of double joint 48, which may help keep the two bows 102, secured thereto, aligned and separated from one another in a generally parallel configuration. Hinge 52, thus, may help to prevent bending of bows 102 as they extend away from double joint 48 across the ceiling. This may also help to provide firmer support for the tarp 110 or roof of tarpaulin system 106.

To secure joints 10 to bows 102, fasteners or screws 55 may be drilled through apertures 34 in first and second supports 18, 20 into bows 102 for securing the parts together.

Figure 17:
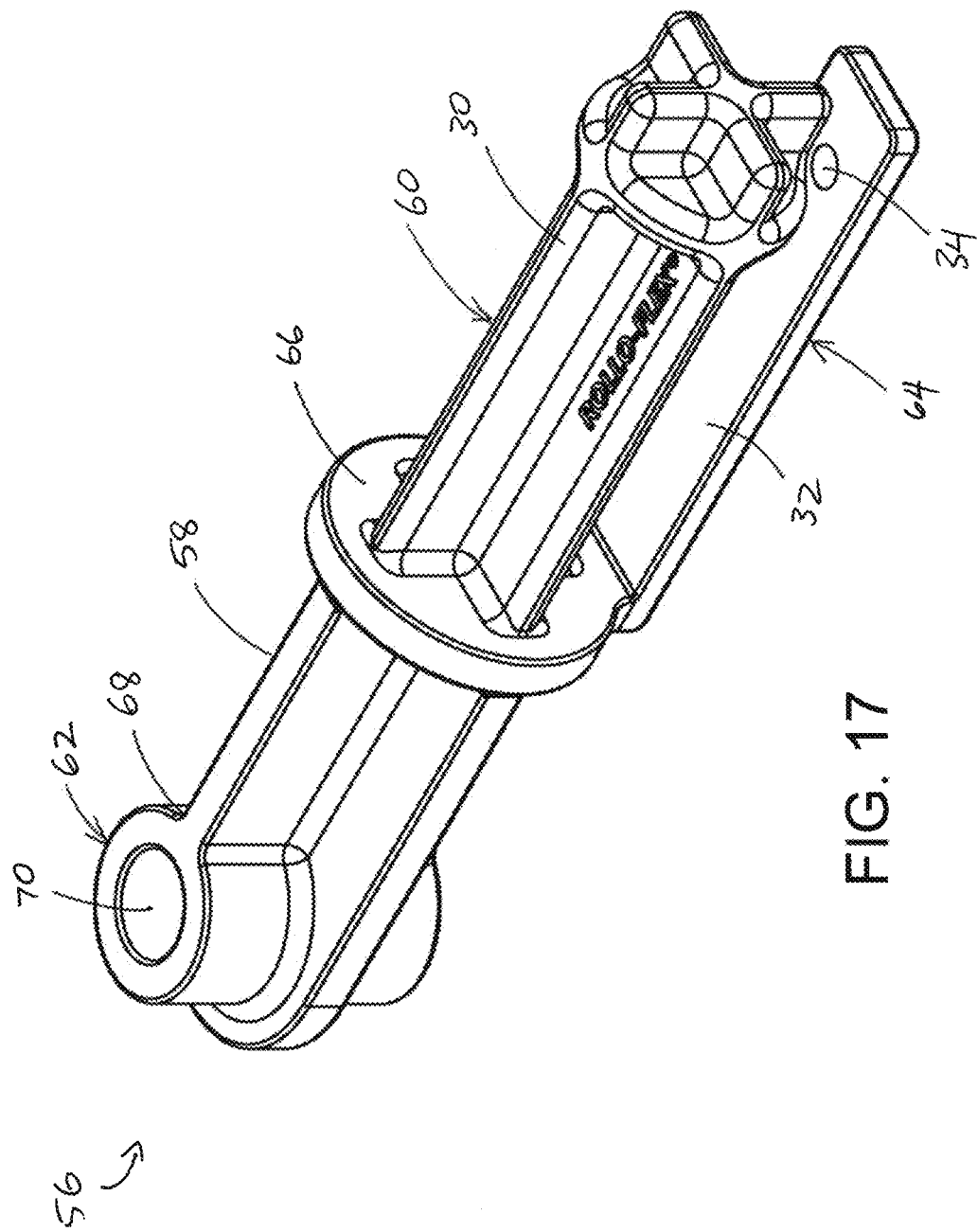
FIG. 17 is an enlarged upper perspective view of the base insert according to FIG. 14 in isolation.
Figure 20:
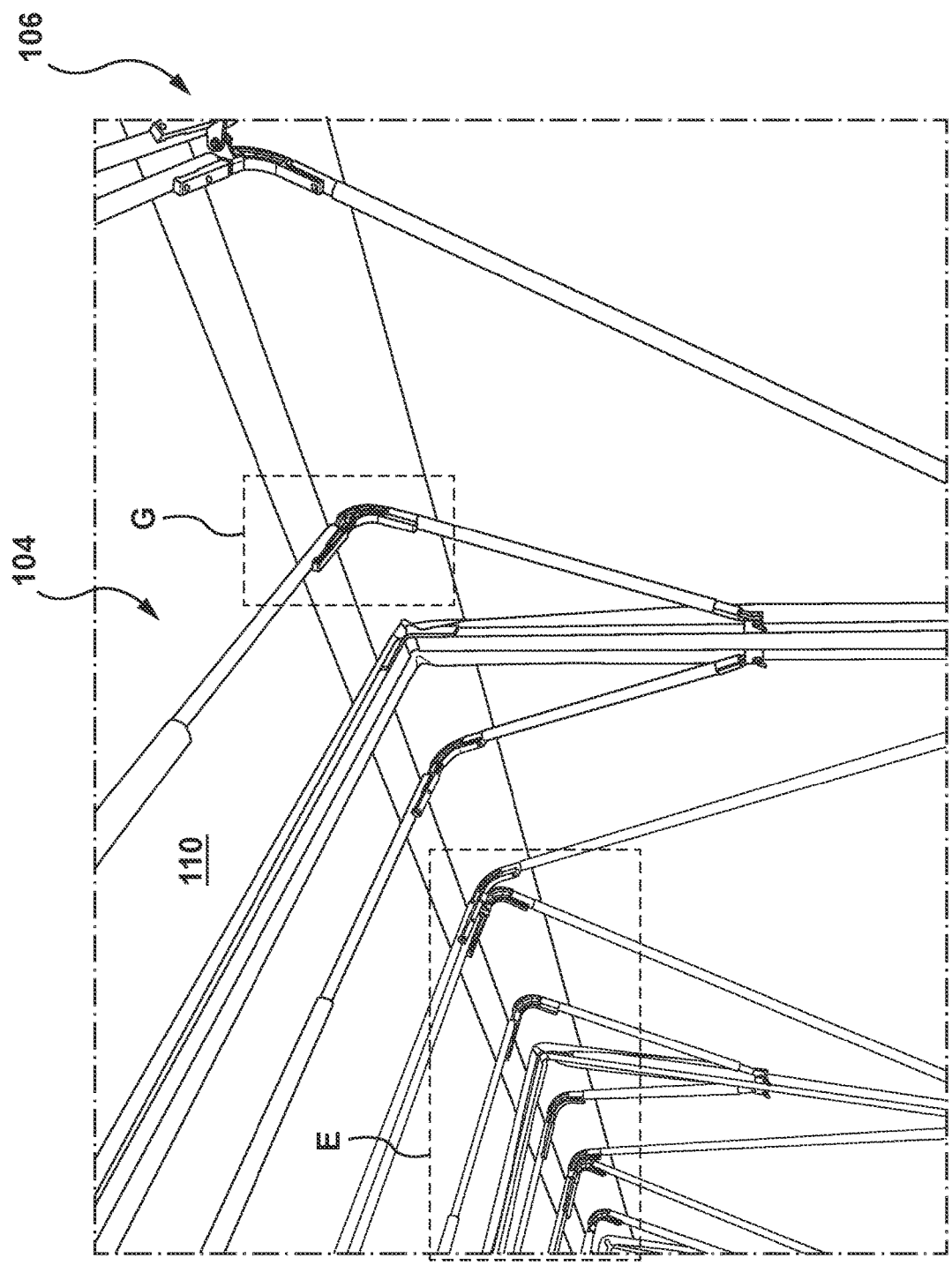
FIG. 20 is an enlarged perspective view of portion C of FIG. 14.
Figure 21:
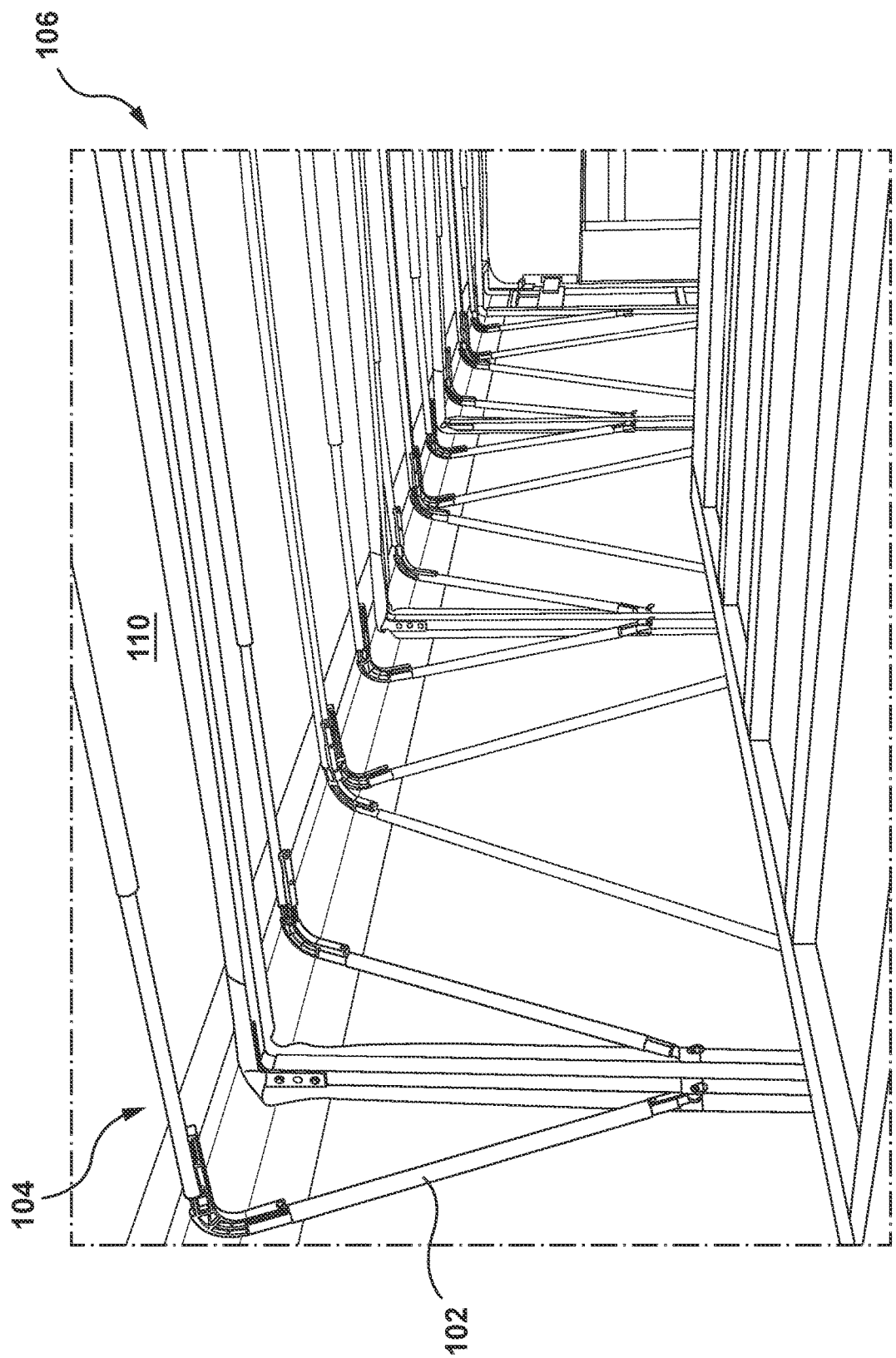
FIG. 21 is an enlarged perspective view of portion D of FIG. 14.
Figure 22:
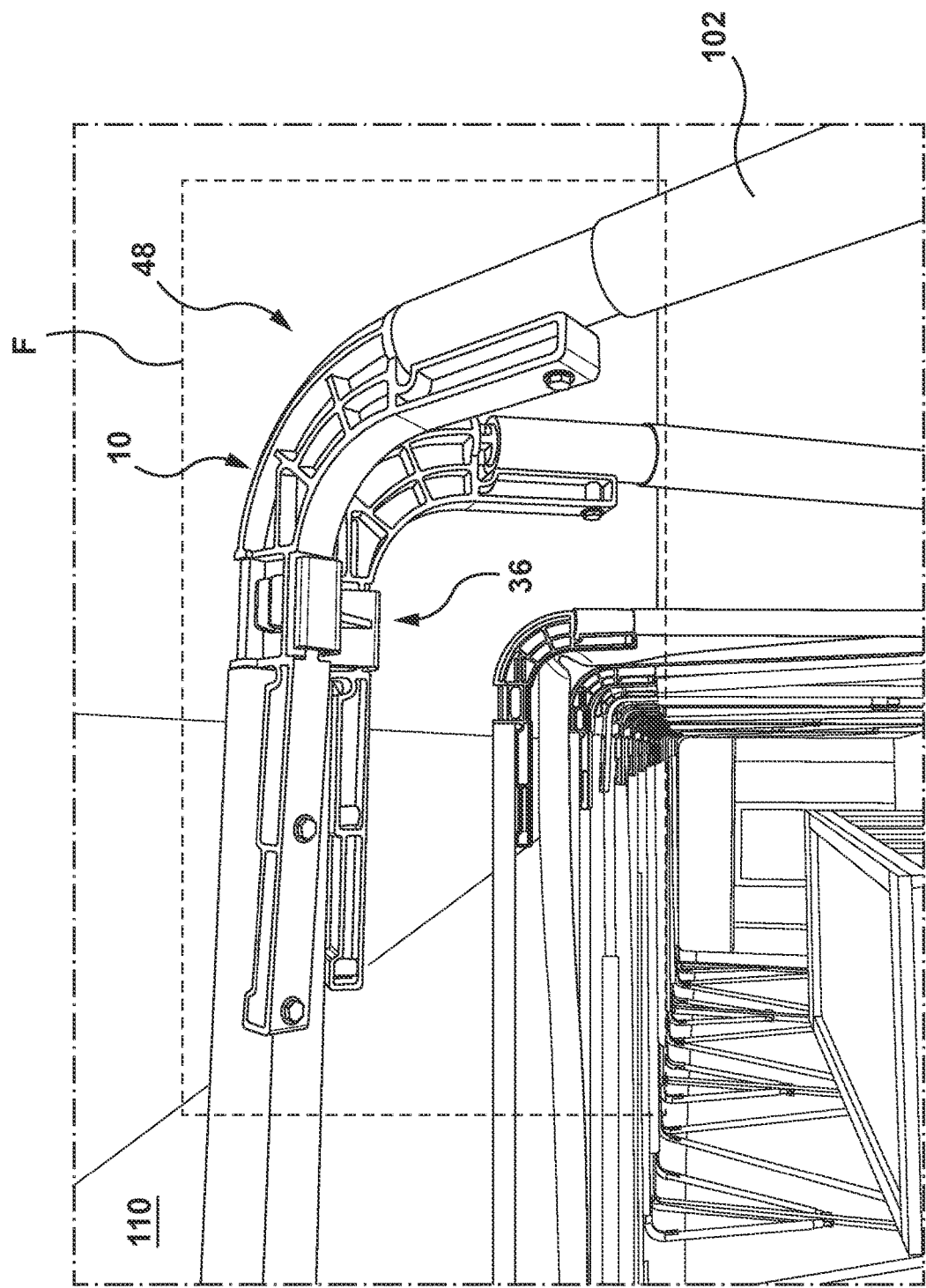
FIG. 22 is a side perspective view of portion E of FIG. 20.
Figure 23:
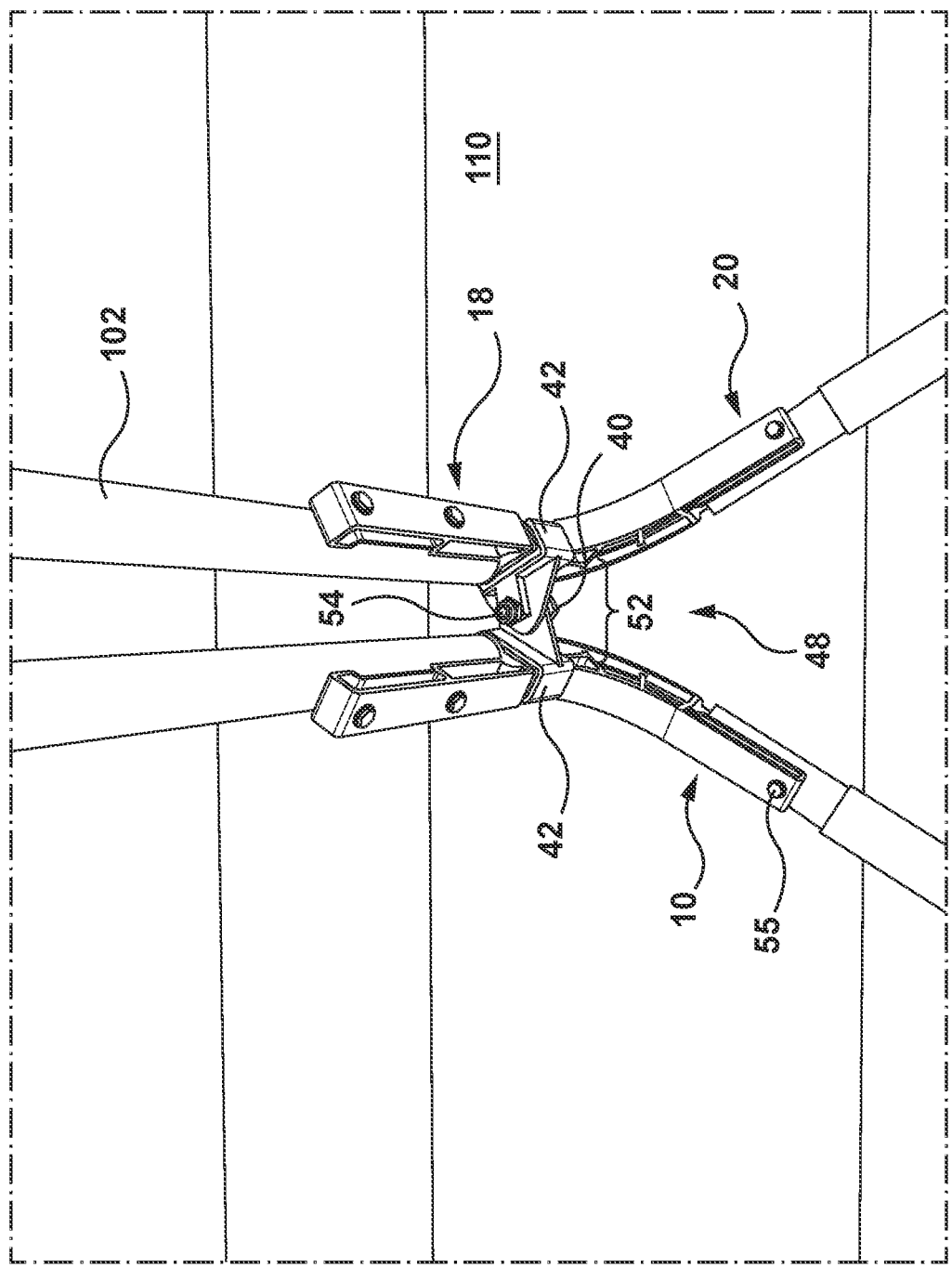
FIG. 23 is an enlarged lower perspective view of portion F of FIG. 22.
Figure 24:
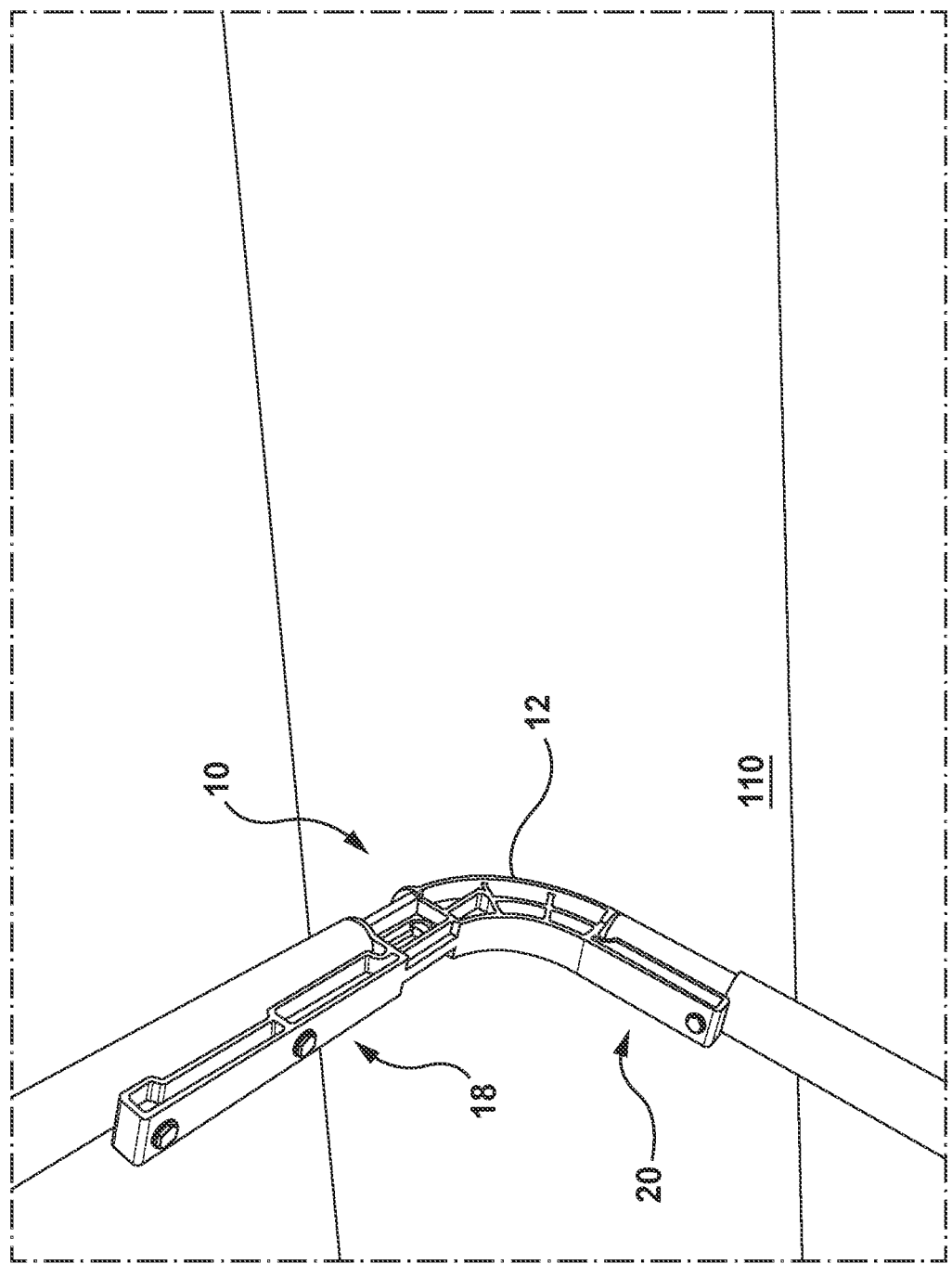
FIG. 24 is an enlarged lower perspective view of portion G of FIG. 20.

As best seen in FIGS. 17-19, joint system 50 may further include a base insert 56 for coupling with a free end 108 of a bow 102. Base insert 56 may include a body component 58, a third coupling member 60, a fourth coupling member 62, and a third support 64.

As shown, body component 58 has a first base end 66 and a second base end 68. Third coupling member 60 extends from first base end 66 and is adapted to releasably engage with free end 108 of one of the plurality of bows 102. Similar to first and second coupling members 14, 16, as depicted, third coupling member 60 comprises an elongate extension 30 which may also frictionally engage within bow 102. As also noted above, third coupling member 60 may have a different structure to releasably retain third coupling members 60 within bow 102.

Fourth coupling member 62 in the present embodiment is fixed to second base end 68, where fourth coupling member 62 is adapted to be securable to a component of uplift system 104.

Third support 64 extends from first base end 66 proximate third coupling member 60 for engagement with the bow that is releasably engagable with third coupling member 60. Third support may also include an aperture 34 that extends through third support 64 towards third coupling member 60, where aperture 34 is dimensioned to receive a fastener therethrough.

Third coupling member 60 and third support 64 may have similar variations as described above regarding first and second coupling members 14, 16, and first and second supports 18, 20. Third coupling member 60 and third support 64 may also collectively function with bow 102 in a similar manner as described above with regards to first and second coupling members 14, 16, and first and second supports 18, 20.

Figure 16:
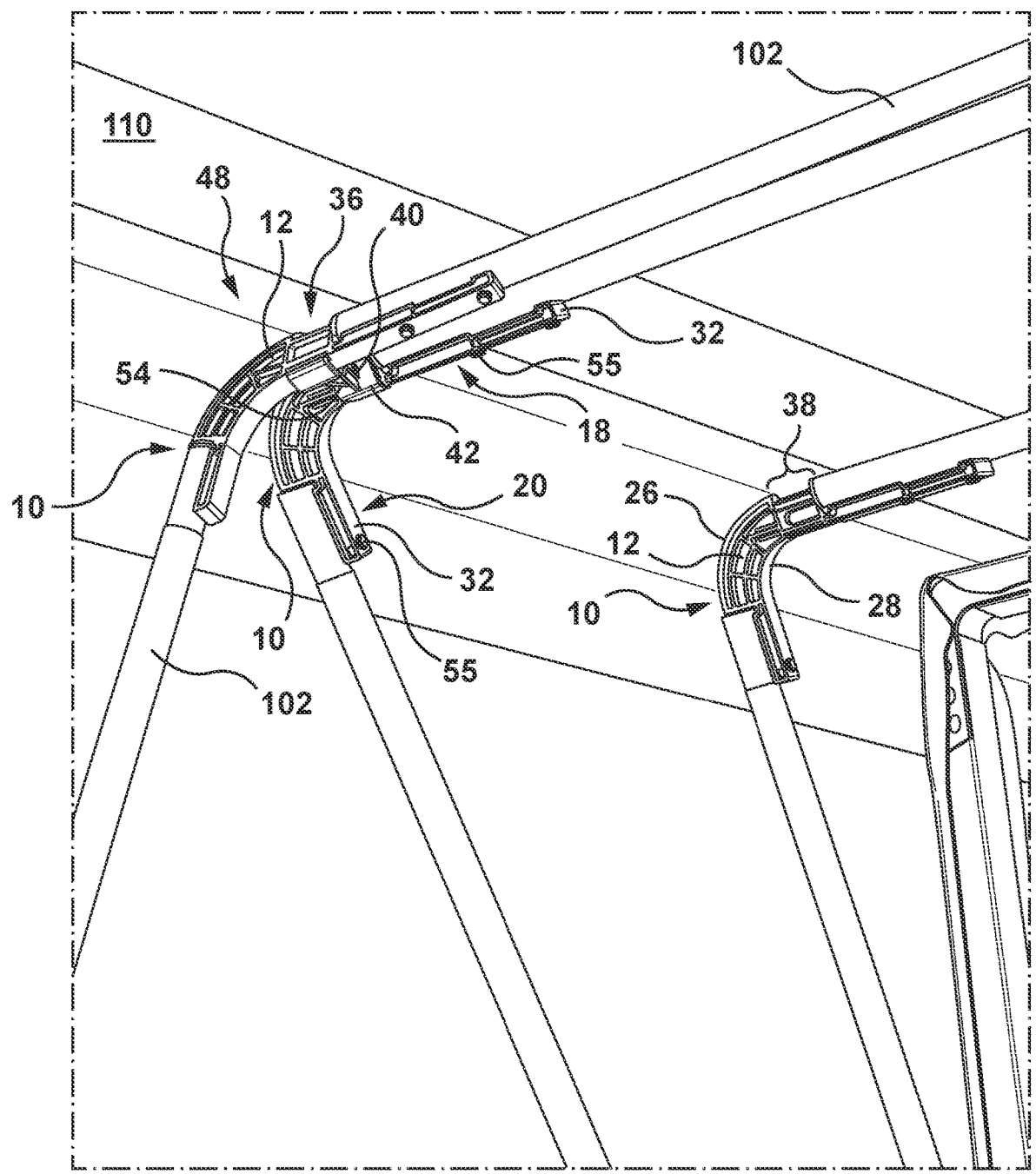
FIG. 16 is an enlarged lower perspective view of portion B of FIG. 14.

Unlike the other coupling members, fourth coupling member 62 comprises an opening 70 through which a fastener may be received for securing base insert 56 to uplift system 104. In this manner, as shown in FIG. 16, base insert 54 may also form part of a hinge in uplift system 104. As would be understood by the skilled person, however, fourth coupling member 62 may be secured to uplift system 104 in a number of different ways.

Due to the fact that base insert 54 is to be used at an opposed free end of bow 102, base insert 54 may be used with single joint 10 and/or with double joint 48 as part of joint system 50.

It will be apparent to those having ordinary skill in the art that certain adaptations and modifications of the described embodiments can be made, consistent with and without departing from the present invention. Unless otherwise indicated, the embodiments described in the invention shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein.

It also will be apparent to those of skill in the art that the present invention can be used with any form of sliding tarpaulin system comprising a tarpaulin affixed to a plurality of cars that slide along a track. For example, the present invention can be used with a curtain-style sliding tarpaulin system installed on a single surface of a covered trailer, in addition to systems that cover flatbed trailers such as the one described herein. Accordingly, the specification and the embodiments disclosed therein are to be considered exemplary only, with the true scope of the present invention being identified in the following claims.

I claim:

1. A joint for use with a pair of bows in an uplift of a tarpaulin system, the joint comprising:
   a corner component with a first end and a second end;
   a first coupling member extending from the first end, the first coupling member adapted to be releasably engagable with an end of one of the pair of bows;
   a second coupling member extending from the second end, the second coupling member adapted to be releasably engagable with an end of the other of the pair of bows; and
   a first support extending from the first end proximate the first coupling member for engagement with the one bow that is releasably engagable with the first coupling member,
   wherein the first support includes an aperture that extends through the first support towards the first coupling member, the aperture dimensioned to receive a fastener therethrough.

2. The joint of claim 1, wherein the corner component has an outer curved surface and an inner curved surface, the first coupling member being positioned adjacent the outer curved surface and the first support being positioned adjacent the inner curved surface.

3. The joint of claim 2, further comprising a second support extending from the second end proximate the second coupling member for engagement with the other bow that is releasably engagable with the second coupling member.

4. The joint of claim 3, wherein the second coupling member is positioned adjacent the outer curved surface and the second support is positioned adjacent the inner curved surface.

5. The joint of claim 4, wherein the first support extends further from the first end than the second support extends from the second end.

6. The joint of claim 3, wherein the second support includes an aperture that extends through the second support towards the second coupling member, the aperture dimensioned to receive a fastener therethrough.

7. The joint of claim 1, wherein the corner component includes a slot running therethrough.

8. The joint of claim 1, wherein the corner component further includes a bracket, the bracket adapted to releasably engage with another bracket to form a hinge.

9. The joint of claim 8, wherein the corner component further includes a bracket coupling portion, and the bracket is releasably securable to the bracket coupling portion of the corner component.

10. The joint of claim 9, wherein the bracket coupling portion is positioned adjacent the first coupling member and the first support.

11. The joint of claim 10, wherein the bracket is adapted to be releasably engagable with the bracket coupling portion through a snap-fit engagement.

12. The joint of claim 11, wherein the bracket comprises a knuckle portion and a leaf portion fixed together.

13. The joint of claim 12, wherein the leaf portion is adapted be releasably engagable with the bracket coupling portion through the snap-fit engagement.

14. A joint system for use with a plurality of bows in an uplift of a tarpaulin system, the joint system comprising a first and second joint, each joint respectively comprising:
   a corner component with a first end and a second end;
   a first coupling member extending from the first end, the first coupling member adapted to be releasably engagable with an end of one of the pair of bows;
   a second coupling member extending from the second end, the second coupling member adapted to be releasably engagable with an end of the other of the pair of bows; and
   a first support extending from the first end proximate the first coupling member for engagement with the one bow that is releasably engagable with the first coupling member;
   wherein the corner component of each joint further includes a bracket, the bracket adapted to releasably engage with another bracket to form a hinge, wherein the bracket of the first joint is a first bracket and the bracket of the second joint is a second bracket, the first and second brackets are collectively engagable to form the hinge.

15. The joint system of claim 14, wherein the first joint's bracket comprises a first knuckle portion and a first leaf portion fixed together, and the second joint's bracket comprises a second knuckle portion and a second leaf portion fixed together, the joint system further comprising a pin dimensioned to be received through the knuckle portions of the first and second joints' brackets.

16. The joint system of claim 14, further comprising a base insert comprising:
   a body component with a first base end and a second base end;
   a third coupling member extending from the first base end, the third coupling member adapted to releasably engage with a free end of one of the plurality of bows;
   a fourth coupling member fixed to the second base end, the fourth coupling member adapted to be securable to a component of the uplift; and
   a third support extending from the first base end proximate the third coupling member for engagement with the bow that is releasably engagable with the third coupling member.

17. The joint system of claim 16, wherein the third support includes an aperture that extends through the third support towards the third coupling member, the aperture dimensioned to receive a fastener therethrough.

18. The joint system of claim 17, wherein the fourth coupling member comprises an opening through which a fastener may be received for securing the base insert to the uplift.

19. The joint system of claim 14, further comprising:
   a base insert comprising:
      a body component with a first base end and a second base end;
      a third coupling member extending from the first base end, the third coupling member adapted to releasably engage with a free end of one of the plurality of bows;
      a fourth coupling member fixed to the second base end, the fourth coupling member adapted to be securable to a component of the uplift; and
      a third support extending from the first base end proximate the third coupling member for engaging with the bow releasably secured with the third coupling member.

* * * * *